O. F. HUNGERFORD.
METHOD OF REPAIRING TIRES.
APPLICATION FILED APR. 18, 1916.

1,207,294.  Patented Dec. 5, 1916.

Inventor
Oliver F. Hungerford
By Moulton & Lomance
Attorneys

UNITED STATES PATENT OFFICE.

OLIVER F. HUNGERFORD, OF MIDDLEVILLE, MICHIGAN, ASSIGNOR, BY DIRECT AND MESNE ASSIGNMENTS, OF ONE-FOURTH TO CHARLES E. CROOKSTON, OF MIDDLEVILLE, MICHIGAN, AND THREE-FOURTHS TO BELL M. SOULE, OF GRAND RAPIDS, MICHIGAN.

METHOD OF REPAIRING TIRES.

1,207,294.  Specification of Letters Patent.  Patented Dec. 5, 1916.

Application filed April 18, 1916. Serial No. 91,884.

*To all whom it may concern:*

Be it known that I, OLIVER F. HUNGERFORD, a citizen of the United States of America, residing at Middleville, in the county of Barry and State of Michigan, have invented certain new and useful Improvements in Methods of Repairing Tires; and I do hereby declare the following to be a full, clear, and exact description of the invention, such as will enable others skilled in the art to which it appertains to make and use the same.

This invention relates to the method of repairing the outer casings of pneumatic tires. Casings of this character in use are very liable to injury and frequently a casing will become injured or weakened at one point resulting usually in what is known as a "blow out". When such blow out takes place a part of the casing is ruptured and the fabric destroyed so that it is incapable of sustaining the pressure to which such casings are subjected. When a blow out takes place it is necessary to either throw the casing away or if it is worth while to have it repaired. Such repairing, however, cannot be done except at a place fully equipped for tire construction and vulcanizing and in any event the tire is rendered useless for the time being.

My invention has for its object and purpose a new method of tire repair which can be utilized immediately after the blow out has occurred and one with which the tire may be repaired by any one at any place without the use of special apparatus.

A further object of the invention consists in the provision of a method of tire repair which when it has been completed renders that section of the tire repaired fully as strong or stronger than the remainder of the tire so that its continued use is made possible without the delay and expense of vulcanizing.

Figure 1:
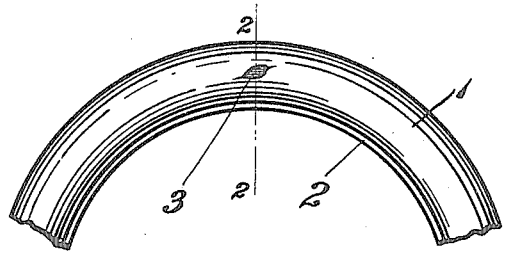
Figure 2:
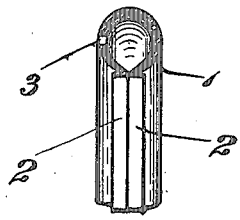
Figure 3:
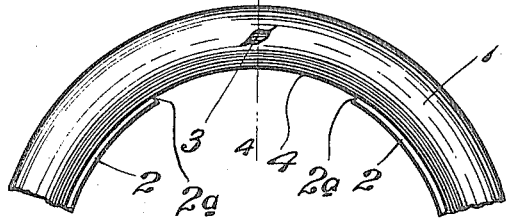
Figure 4:
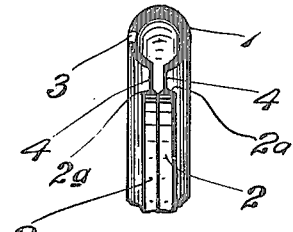
Figure 5:
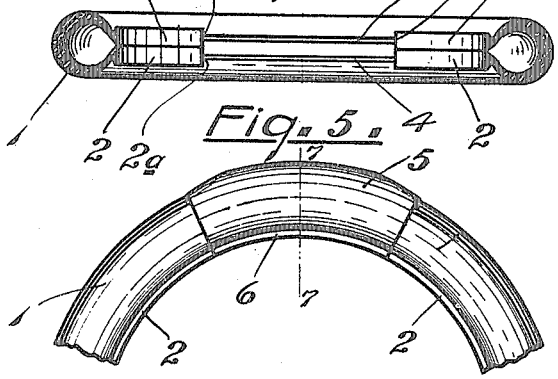
Figure 6:
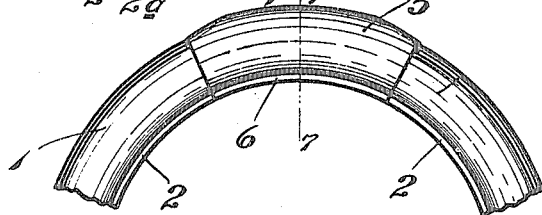
Figure 7:
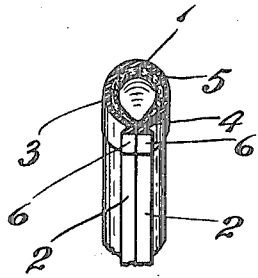
Figure 8:
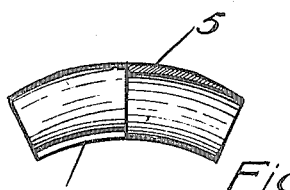
Figure 9:
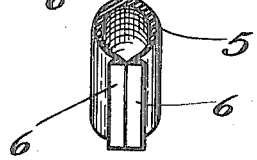

Many other objects and purposes of the invention will appear as understanding thereof is had from the following description reference being had to the accompanying drawing in which, Figure 1 is a side elevation of a fragment of a tire casing showing a rupture or blow out therein. Fig. 2 is a section on the line 2—2 of Fig. 1. Fig. 3 is a view similar to Fig. 1 showing the casing after the first step of the method of repairing has been completed. Fig. 4 is a section on line 4—4 of Fig. 3. Fig. 5 is an under plan view of the device shown in Fig. 3. Fig. 6 is a side elevation of the tire after the covering boot has been applied thereto to cover the blow out. Fig. 7 is a section on the line 7—7 of Fig. 6. Fig. 8 is a side elevation with a part in section of the covering or repairing boot and Fig. 9 is an end view thereof.

Like reference characters refer to like parts throughout the several views of the drawing.

The tire casing is of the usual clencher type being provided with beads 2 which are adapted to engage under inturned portions of the wheel rim as is well understood. When a blow out or rupture such as indicated at 3 occurs a portion of the bead 2 is cut away to each side of the blow out at both edges of the tire casing. In practice I prefer to cut the beads a distance of 4 or 5 inches to each side of the blow out, though it is to be understood that this particular distance itself is not essential to the working of the invention. When the bead is cut away as described there is left an edge 4 at the thinnest portion of the tire between shoulders 2ª at the points where the bead was cut as best shown in Fig. 3.

A boot comprised of a body portion 5 with clencher beads 6 thereon is provided, the boot in fact being a section of a tire casing of the same size as the casing repaired. The boot is cut so as to be slightly longer than the distance between shoulders 2ª. This boot is placed around the tire casing 1, beads 6 being inserted in the spaces left where beads 2 are removed. The tire is then placed upon the wheel, beads 2 and 6 together making smooth and practically unbroken beads for engagement with the wheel rim. This is easily accomplished as the casing 1 is deflated at the time the boot is attached and it may be compressed sufficiently to permit the attachment of the boot in the manner described. The tire is then inflated and by reason of the pressure to which the tire is subjected it engages very tightly against the inner sides of the boot, in fact so tightly that entrance of water or dirt is absolutely prohibited. When the tire is inflated the slightly greater length of the boot beads 6 over the distance between the shoulders 2ª is compensated for in the stretching of the tire. If desired the inside of the casing 1 may be made smooth where the fabric is disrupted in any suitable manner as by placing a piece of fabric, tire liner or the like over the place of rupture. A tire repaired in this manner is as strong or stronger at the place repaired as it was before. The boot is absolutely locked to tire and cannot creep in any direction as now frequently occurs with the temporary lace-on or hook boots sometimes used. Furthermore the boot is of regular tire casing structure and does not wear out in a few days as is the case with such temporary devices but will last as long as the tire does; also the boot being of the same diameter as the casing there is practically no difference in diameter at any point in the repaired tire as when it is inflated the boot and the tire both assume the same diameter, that part of the casing within the boot being merely held compressed to a smaller diameter than the remainder of the tire casing.

I claim:

1. The method of repairing tire casings of the clencher type which consists in removing the clencher beads from the casing a distance to each side of the place to be repaired, then providing a boot to pass around the casing, said boot having clencher beads entering the spaces left in the casing made by said removal of the beads from the casing, and then placing the casing and boot on a wheel and inflating the tire, substantially as described.

2. The method of repairing tire casings of the clencher type which consists in cutting away the clencher beads from the casing a distance to each side of the place to be repaired, then taking a section of tire casing of the same type and diameter as the casing to be repaired and placing it around the casing with the clencher beads thereof seating in the spaces provided by cutting away the beads from the casing, then placing the casing and boot on a wheel and inflating the tire substantially as described.

3. The method of repairing tire casings of the clencher type which consists in removing the clencher beads from the casing a distance to each side of the place to be repaired, then taking a section of a tire casing of the same type and diameter as the casing to be repaired and having length slightly longer than the length of the beads removed from the casing, then placing said section of casing around the casing to be repaired with the beads on said section entering the spaces left by removal of said beads from the casing to be repaired, substantially as described.

4. The method of repairing tire casings of the clencher type which consists in placing a section of tire casing of the same type and diameter as the casing to be repaired around said casing and interlocking the beads of said casing to be repaired and section of casing around it by removing portions of the bead on the casing adjacent the section to be repaired and inserting corresponding beads on said section of casing in the spaces left by removal of beads on the casing and then placing both casing and section of casing on a clencher rim and inflating the tire, substantially as described.

In testimony whereof I affix my signature.

OLIVER F. HUNGERFORD.